United States Patent
Chan et al.

(10) Patent No.: US 11,371,721 B2
(45) Date of Patent: Jun. 28, 2022

(54) PUSH PIN BEARING MECHANISM FOR ACTUATORS

(71) Applicant: Computime Ltd., New Territories (HK)

(72) Inventors: Dick Kwai Chan, Hong Kong (CN); Hamza Yilmaz, Gilroy, CA (US); Ben Ren Tan, Shenzhen (CN); Wai-Leung Ha, Hong Kong (CN)

(73) Assignee: Computime Ltd., New Territories (HK)

( * ) Notice: Subject to any disclaimer, the term of this patent is extended or adjusted under 35 U.S.C. 154(b) by 0 days.

(21) Appl. No.: 17/093,017

(22) Filed: Nov. 9, 2020

(65) Prior Publication Data

US 2021/0055006 A1 Feb. 25, 2021

Related U.S. Application Data

(62) Division of application No. 15/869,859, filed on Jan. 12, 2018, now Pat. No. 10,871,293.

(60) Provisional application No. 62/525,457, filed on Jun. 27, 2017.

(51) Int. Cl.
 *F16K 31/04* (2006.01)
 *F24D 19/10* (2006.01)
 *F16K 31/53* (2006.01)
 *F16K 31/00* (2006.01)
 *G05D 23/19* (2006.01)

(52) U.S. Cl.
 CPC ........ *F24D 19/1018* (2013.01); *F16K 31/002* (2013.01); *F16K 31/047* (2013.01); *F16K 31/53* (2013.01); *G05D 23/19* (2013.01); *F24D 2220/0257* (2013.01)

(58) Field of Classification Search
 CPC ......... F24D 19/1018; F24D 2220/0257; F16K 31/002; F16K 31/047; F16K 31/53; G05D 23/19
 See application file for complete search history.

(56) References Cited

U.S. PATENT DOCUMENTS

| 3,108,487 A | 10/1963 | Sandler |
| 2011/0115319 A1 | 5/2011 | Schade et al. |

FOREIGN PATENT DOCUMENTS

| CN | 102686923 A | 9/2012 |
| DE | 3153654 C2 | 9/1990 |
| DE | 102013016545 A1 | 4/2015 |
| EP | 0923013 A1 | 6/1999 |
| EP | 3073205 A1 | 9/2016 |

(Continued)

OTHER PUBLICATIONS

Apr. 26, 2021—(CN) Office Action—App. No. 201810670302.8.

(Continued)

*Primary Examiner* — P. Macade Nichols
(74) *Attorney, Agent, or Firm* — Banner & Witcoff, Ltd.

(57) ABSTRACT

A thermostatic radiator valve (TRV) assembly or automatic temperature balanced actuator (ABA) assembly controls a manifold assembly through a push pin bearing mechanism. The push pin bearing mechanism comprises a push pin that moves in a linear direction responsive to rotational movement of a motor gear that is coupled through a helical gear. Rotational movement of the push pin is prevented by a ball bearing assembly. Movement of the push pin is transferred to a manifold pin, which in turn, controls the manifold assembly. Because the push pin moves in a linear rather than a rotational fashion, erosion of the mated manifold pin is substantially reduced with respect to transitional approaches.

18 Claims, 7 Drawing Sheets

(56) References Cited

FOREIGN PATENT DOCUMENTS

KR      101604415 B1    3/2016
WO      2015036332 A1   3/2015

OTHER PUBLICATIONS

Feb. 15, 2019—(EP) European Search Report—App EP 18184018.
Apr. 6, 2020—U.S. Non-Final Office Action—U.S. Appl. No. 15/869,859.
Feb. 3, 2022—(EP) Communication pursuant to Article 94(3) EPC—App. No. 18184018.2.

PUSH PIN BEARING MECHANISM FOR ACTUATORS

This patent application is a divisional application of U.S. patent application Ser. No. 15/869,859 entitled "Push Pin Bearing Mechanism for Actuators" filed on Jan. 12, 2018 which claims priority to U.S. provisional patent application Ser. No. 62/525,457 entitled "Push Pin Bearing Mechanism for Actuators" filed on Jun. 27, 2017, both of which are hereby incorporated by reference in their entirety.

TECHNICAL FIELD

Aspects of the disclosure relate to a ball bearing assembly that prevents rotation of a push pin, thus substantially reducing erosion of a mating manifold pin when the push pin and the manifold pin are in contact.

BACKGROUND

A thermostatic radiator valve (TRV) is a self-regulating valve fitted to a hot water heating system radiator, to control the temperature of a room by changing the flow of hot water through the radiator. However, with traditional approaches, a TRV may incur erosion to internal components, thus causing improper operation of the TRV.

BRIEF DESCRIPTION OF THE DRAWINGS

The present disclosure is illustrated by way of example and not limited in the accompanying figures in which like reference numerals indicate similar elements and in which.

SUMMARY OF INVENTION

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

In one embodiment in accordance with aspects of the disclosure, a bearing assembly prevents rotation of push pin, thus substantially reducing wear (erosion) of the mating manifold pin when the push pin and the manifold pin are in contact. Linear movement of the push pin moves the manifold pin to position a valve in a manifold assembly.

With another aspect, a push pin bearing assembly comprises a housing, a motor gear, a coupling gear, a bearing assembly, a tube, and a push pin. The coupling gear is screwed into the housing and coupled to the motor gear in order to transfer the rotational movement from the motor gear to the coupling gear. The push pin is inserted to the bearing assembly and fixed onto the tube, where the push pin moves in a linear direction responsive to the rotational movement of the coupling gear and is capable of being in contact with a manifold pin. The bearing assembly prevents the rotational movement from being transferred to the push pin when the push pin is in contact with the manifold pin.

With another aspect, a bearing assembly comprises an upper plate, lower plate, and middle plate situated between the upper and lower plates and retaining a plurality of bearings. The upper plate and the middle plate are capable of rotating with a coupling gear of a push pin bearing assembly while the lower plate and the push pin are stationary with respect to the manifold pin when the push pin and the manifold pin are in contact with each other.

With another aspect, a push pin bearing assembly is applied to an automatic temperature balanced actuator (ABA) application.

With another aspect, a push pin bearing assembly is applied to a thermostatic radiator valve (TRV) application.

These and additional aspects will be appreciated with the benefit of the disclosures discussed in further detail below.

DETAILED DESCRIPTION

Figure 1:
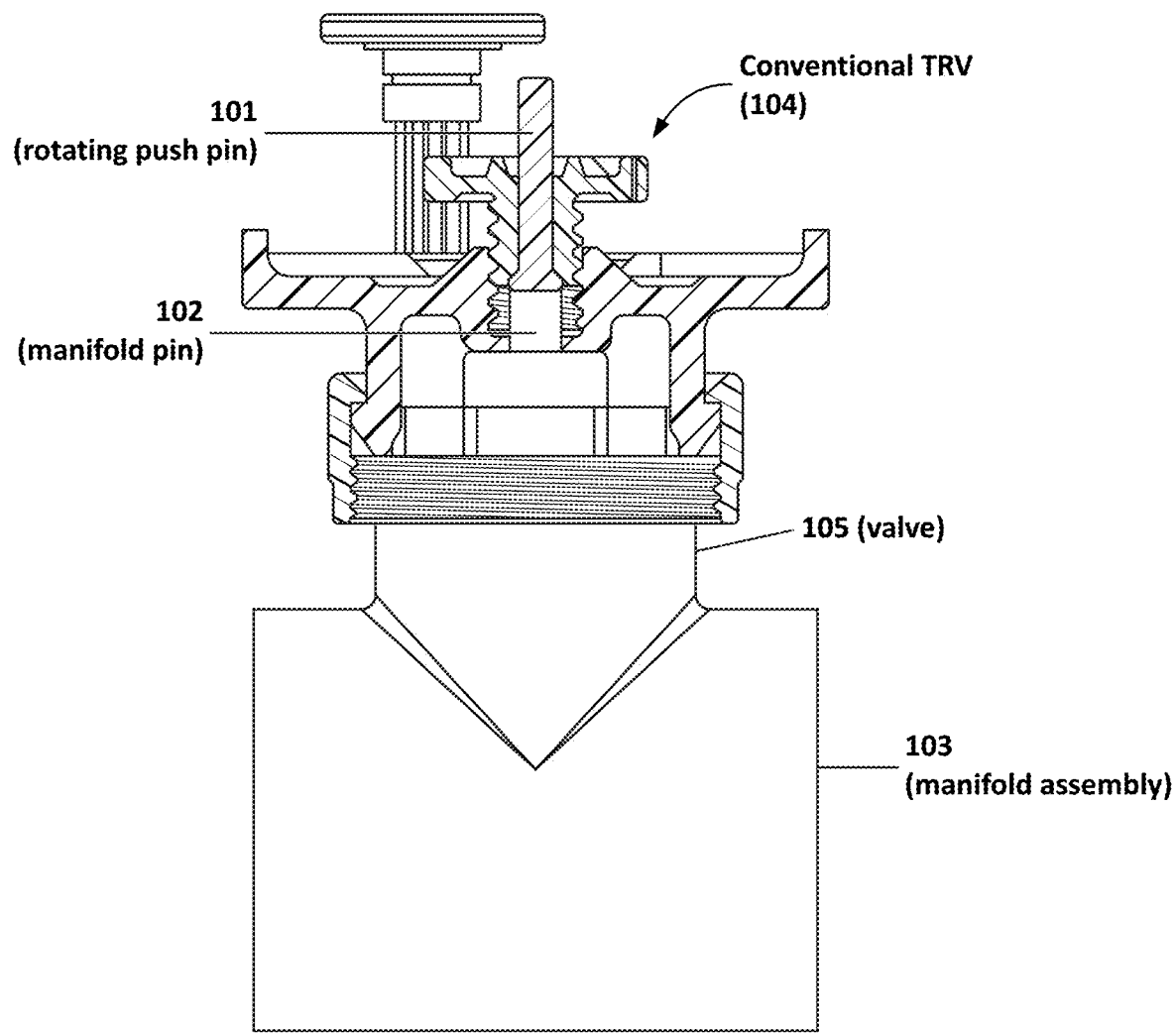
FIG. 1 shows a thermostatic radiator valve (TRV) with a rotating push pin in accordance with prior art.

FIG. 1 shows a thermostatic radiator valve (TRV) 104 that controls a manifold assembly 103 according to traditional approaches. Traditional TRV 104 may comprise push pin 101 that typically causes erosion (for example, wear due to friction) to manifold pin 102 when in contact while push pin 101 is rotating. Similar traditional approaches may be used for other applications such as an automatic temperature balanced actuator (ABA).

According to an aspect of the embodiments, as will be discussed, a bearing assembly prevents rotation of push pin, thus substantially reducing wear (erosion) of the mating manifold pin when the push pin and the manifold pin are in contact.

Figure 2:
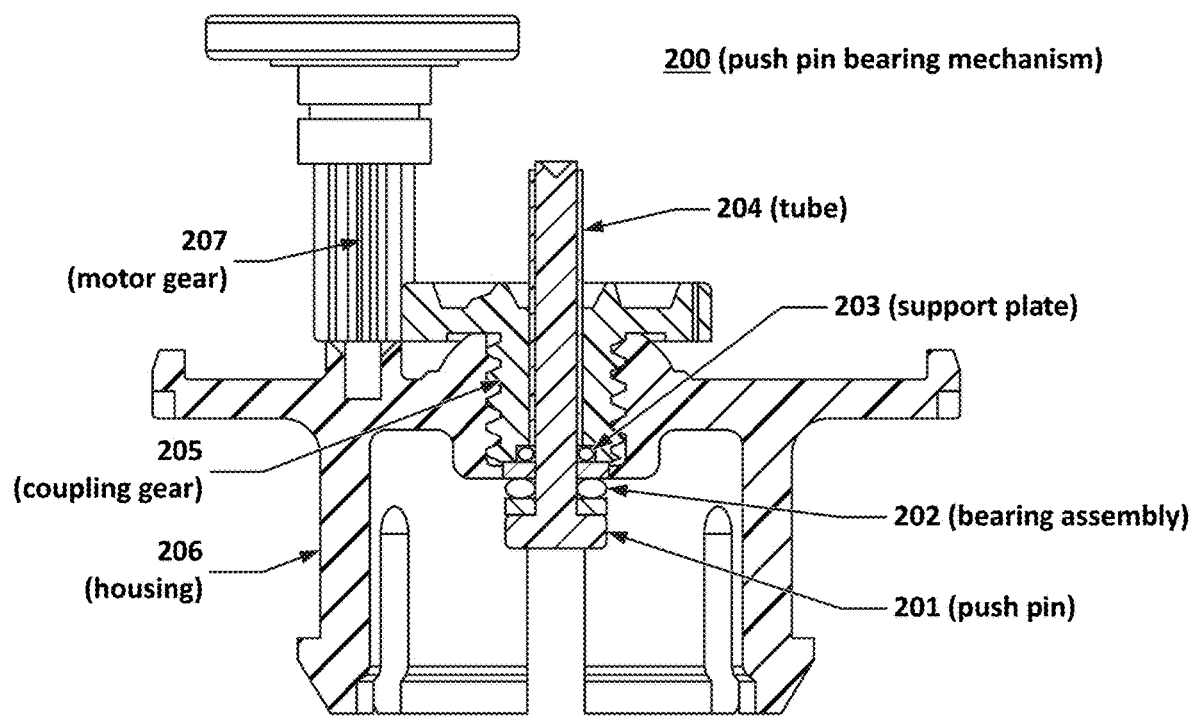
FIG. 2 shows a push pin bearing mechanism according to one or more aspects of the present disclosure.

FIG. 2 shows a push pin bearing mechanism 200 according to one or more aspects of the present disclosure. Mechanism 200 comprises push pin 201, ball bearing assembly 202, support plate 203, tube 204, coupling gear 205, housing 206, and motor gear 207. As will be discussed in further detail, push pin bearing mechanism 200 substantially prevents rotational motion from being transferred to push pin 201.

Push pin 201 may move a manifold pin (not explicitly shown) when in contact. The manifold pin, in turn, may position a valve to control liquid (fluid) flow through a manifold assembly, thus controlling energy transferred to an associated radiator.

Figure 3:
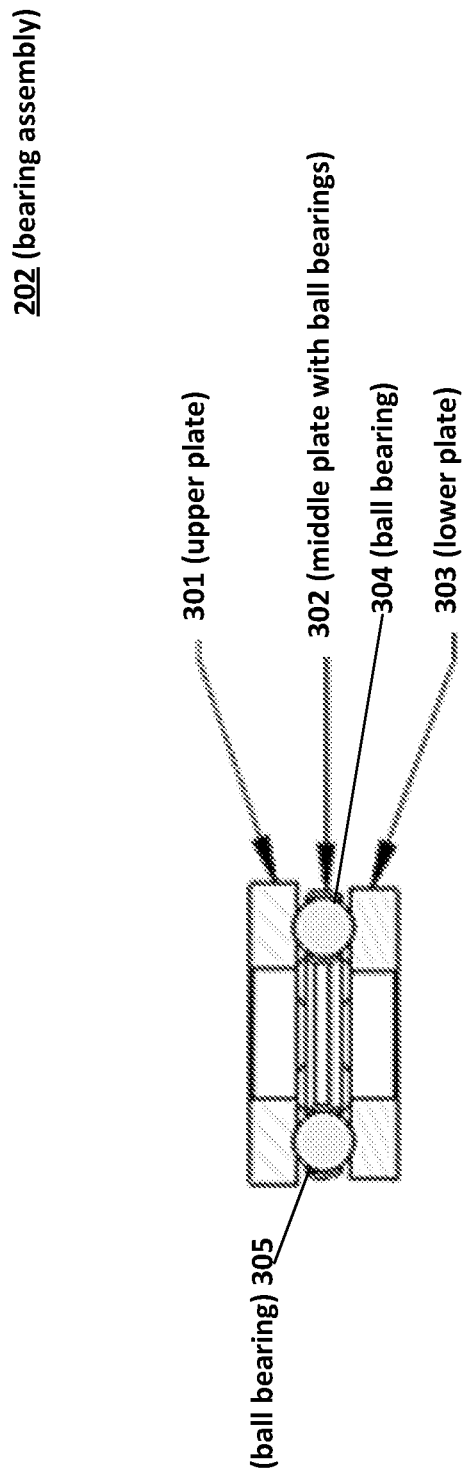
FIG. 3 shows a ball bearing assembly used by the push pin bearing mechanism shown in FIG. 2 according to one or more aspects of the disclosure.

FIG. 3 shows bearing assembly 202 used by push pin bearing mechanism 200, as shown in FIG. 2, according to one or more aspects of the disclosure. Bearing assembly 202 comprises upper plate 301, middle plate 302 and lower plate 303. With some embodiments, middle plate 302 retains a plurality of ball bearings including ball bearings 304 and 305. However, some embodiments may incorporate a different type of bearing including a roller bearing, jewel bearing, fluid bearing, magnetic bearing, and the like.

With an aspect of the disclosure, retainers for balling bearings 304 and 305 may be formed from middle plate 302 (such as when middle plate 302 is stamped during a manufacturing process), where the bearing retainer is an integral part of middle plate 302.

Referring to FIG. 2, while tube 204 is pressed fit onto helical gear 205, the fittings between tube 204 and push pin 201 and between ball bearing assembly 202 and push pin 201 allow for upward or downward movement (which may be referred as linear movement) of push pin 201 responsive to the rotation of coupling gear 205. However, ball bearing assembly 202 prevents rotational movement from being transferred to push pin 201 as soon as push pin 201 contacts with the manifold pin (not explicitly shown). The friction incurred between the manifold pin and push pin 201 contact surfaces stops push pin 201 from rotating. Referring to FIG. 3, bearing upper plate 301 and bearing middle plate 302 with ball bearings 304 and 305 rotate together with coupling gear 205 (as shown in FIG. 2) while lower plate 303 and the push pin 201 (as shown in FIG. 2) are kept stationary with respect to the manifold pin when push pin 201 is in contact with the manifold pin.

With an aspect of the disclosure, push pin 201 is inserted to support plate 203 to position push pin 201.

With an aspect of the disclosure, coupling gear 205 may comprise a helical gear, spur gear, worm gear, bevel gear, and the like.

Figure 4:
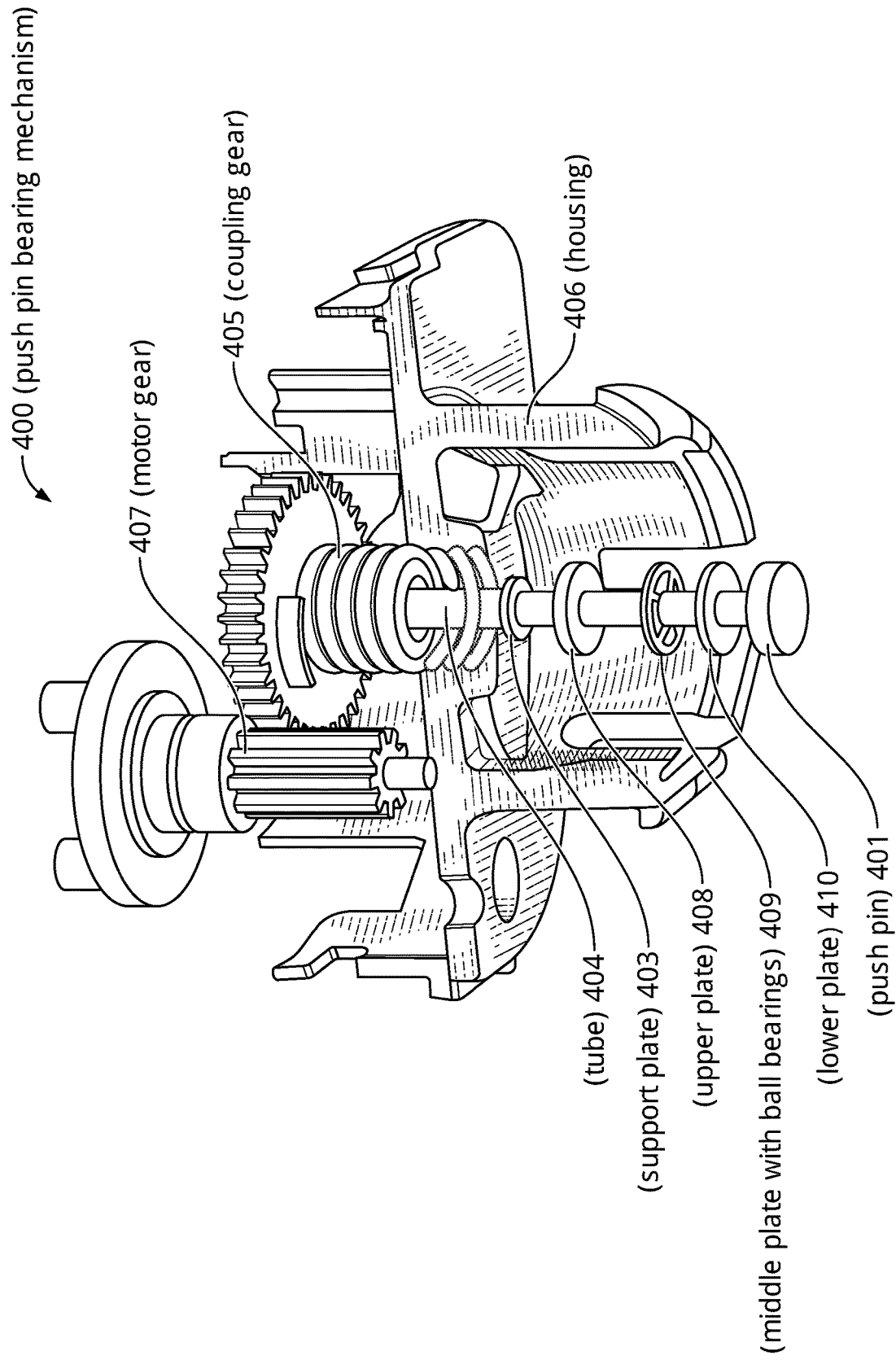
FIG. 4 shows a three-dimensional composite of the push pin bearing mechanism shown in FIGS. 2 and 3 according to one or more aspects of the disclosure.

FIG. 4 shows three-dimensional composite 400 of the push pin bearing mechanism shown in FIG. 2 and FIG. 3 according to one or more aspects of the disclosure. Support plate 403 and the ball bearing assembly (comprising upper plate 408, middle plate 409, and lower plate 410) are inserted to push pin 401. Push pin 401 is fixed onto the tube 404. Tube 404 is pressed fit onto helical gear 405. Helical gear 405 is screwed into housing 406 and motivated by motor gear 407 when motor gear 407 rotates.

When motor gear 407 is rotating either clockwise or anticlockwise, motor gear 407 provides a torque force to helical gear 405, causing helical gear 405 to rotate and at the same time transmitting the force and resulting in a vertical (linear) motion along the screw thread of housing 406. Helical gear 405 causes tube 404, support plate 403, ball bearing assembly, and push pin 401 to move up and down together. Tube 404, support plate 403, bearing upper plate 408, and bearing middle plate 409 (comprising a plurality of ball bearings) rotate together with helical gear 405 while lower plate 410 and push pin 401 are kept stationary by contact area friction among the manifold pin (not explicitly shown). Consequently, push pin 401 moves only vertically (linearly) in push pin bearing mechanism 400.

Because push pin 401 does not encounter rotational movement when in contact with the manifold pin, resulting erosion to the manifold pin may be ameliorated relative to traditional approaches.

Figure 5:
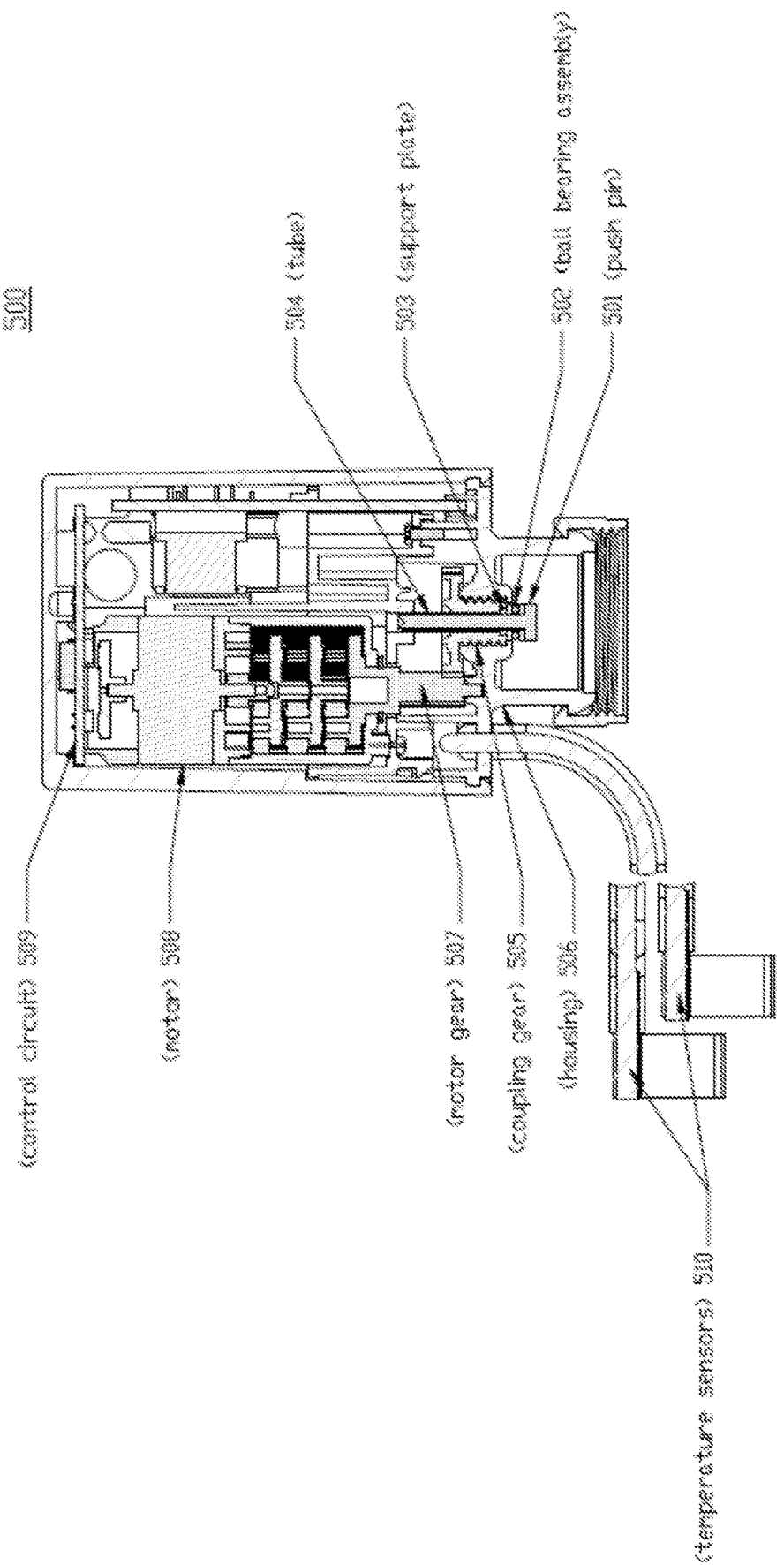
FIG. 5 shows the push pin bearing mechanism incorporated in an automatic temperature balanced actuator (ABA) application according to one or more aspects of the disclosure.

FIG. 5 shows push pin bearing mechanism 500 used in an automatic temperature balanced actuator (ABA) application according to one or more aspects of the disclosure. Push pin bearing mechanism 500 of an ABA may be coupled to a manifold assembly (not explicitly shown) of a underfloor heating and/or cooling circuit. The ABA may include or may be connected to two temperature sensors 510, where the first and second temperature sensors 510 are located at emitter flow and return pipes, respectively, of the manifold assembly. Consequently, the ABA can determine the temperature differential and adjust the actuator position a constant temperature differential between the emitter flow and return pipes.

With some embodiments, a manifold assembly is the hub of a heating/cooling system that distributes water throughout a building. The manifold assembly provides a central place to connect both emitter flow (supply) and return lines. Supply water from the heat/cooling source enters the manifold assembly and circulates fluid (for example, hot water) throughout the system. Water flow through the manifold assembly is controlled by a manifold control mechanism that comprises a manifold pin and manifold valve. As discussed above, the manifold pin is driven by a push pin.

Referring to FIG. 5, push pin bearing mechanism 500 comprises control circuit 509, which obtains an input signal that is indicative of a temperature differential and converts the input signal to the control signal for motor 508.

With some embodiments, an automatic temperature balanced actuator assembly includes a manifold assembly, where the manifold assembly comprises an emitter flow pipe and a return pipe for circulating fluid (for example, water). The actuator determines the differential temperature between the emitter flow pipe and the return pipe. The automatic temperature balanced actuator assembly may include first and second temperature sensors 510 located at the emitter flow pipe and the return pipe, respectively, where the temperature differential equals the difference between first and second temperature measurements obtained from the first and second temperature sensors 510, respectively.

Control circuit 509 drives motor 508 so that a rate of fluid flow through the manifold assembly is controlled by the position of a manifold valve based on the differential temperature.

When motor gear 507 is rotating either clockwise or anticlockwise as driven by motor 508, motor gear 507 provides a torque force to helical gear 505, causing helical gear 505 to rotate and at the same time transmitting the force and resulting in a vertical (linear) motion along the screw thread of housing 506.

Push pin 501 is inserted to support plate 503 to position push pin 501. While tube 504 is pressed fit onto helical gear 505, the fittings between tube 504 and push pin 501 and between ball bearing assembly 502 and push pin 501 allow for upward or downward movement (which may be referred as linear movement) of push pin 501 responsive to the rotation of coupling gear 505 (for example, a helical gear).

As previously discussed, ball bearing assembly 502 prevents rotational movement from being transferred to push pin 501 as soon as push pin 501 contacts the manifold pin (not explicitly shown). The friction incurred between the manifold pin and push pin 501 contact surfaces stops push pin 501 from rotating.

Figure 6:
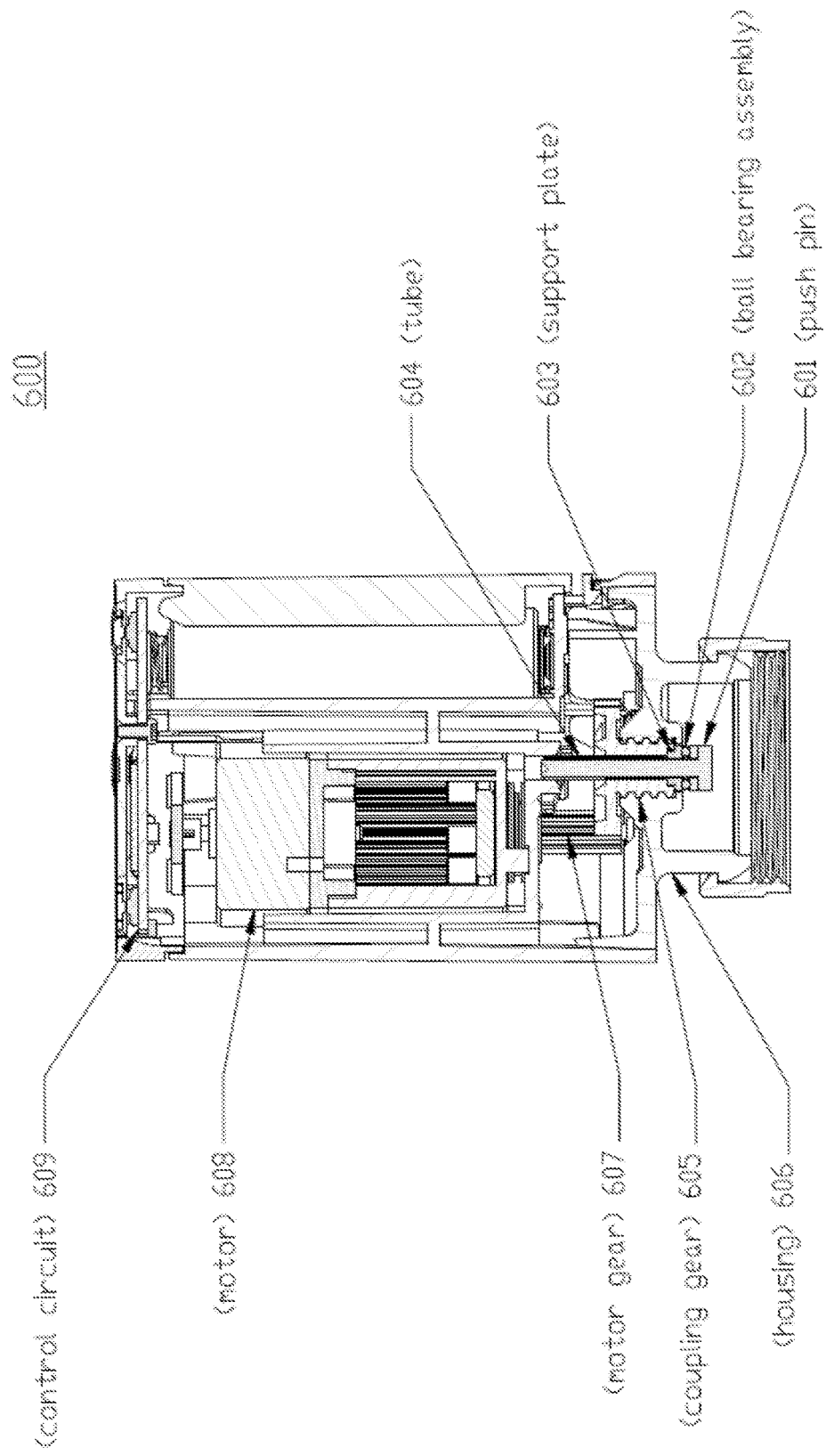
FIG. 6 shows the push pin bearing mechanism incorporated in a thermostatic radiator valve (TRV) application according to one or more aspects of the disclosure.

FIG. 6 shows push pin bearing mechanism 600 used in a TRV application according to one or more aspects of the disclosure. Push pin bearing mechanism 600 may be coupled to a manifold assembly of a underfloor heating and/or cooling circuit. The TRV may include or may be connected to a temperature sensor that measures the temperature of a controlled environment. Consequently, the TRV controls the liquid flow (for example, water) between emitter flow and return pipes to achieve a desired temperature of the controlled environment.

With some embodiments, a manifold assembly is the hub of a heating/cooling system and distributes water throughout a building. The manifold assembly provides a central place to connect both emitter flow (supply) and return lines. Supply water from the heat/cooling source enters the manifold assembly and circulates fluid (for example, hot water) throughout the system. Water flow through the manifold assembly is controlled by a manifold control mechanism that comprises a manifold pin and manifold valve. As discussed above, the manifold pin is driven by a push pin.

Referring to FIG. 6, push pin bearing mechanism 600 comprises control circuit 609, which obtains an input signal that is indicative of the measured environmental temperature and converts the input signal to the control signal for controlling motor 608.

With some embodiments, a thermostatic radiator valve assembly includes a manifold assembly, where the manifold assembly comprises an emitter flow pipe and a return pipe for circulating fluid (for example, water). Control circuit 609 drives motor 608 so that a rate of fluid flow through the manifold assembly is controlled by the position of a manifold valve based on the measured environmental temperature and a desired temperature.

When motor gear 607 is rotating either clockwise or anticlockwise as driven by motor 608, motor gear 607 provides a torque force to helical gear 605, causing helical gear 605 to rotate and at the same time transmitting the force and resulting in a vertical (linear) motion along the screw thread of housing 606.

Push pin 601 is inserted to support plate 603 to position push pin 601. While tube 604 is pressed fit onto helical gear 605, the fittings between tube 604 and push pin 601 and between ball bearing assembly 602 and push pin 601 allow for upward or downward movement (which may be referred as linear movement) of push pin 601 responsive to the rotation of coupling gear 605 (for example, a helical gear).

As previously discussed, ball bearing assembly 602 prevents rotational movement from being transferred to push pin 601 as soon as push pin 601 contacts the manifold pin (not explicitly shown). The friction incurred between the manifold pin and push pin 601 contact surfaces stops push pin 601 from rotating.

Figure 7:
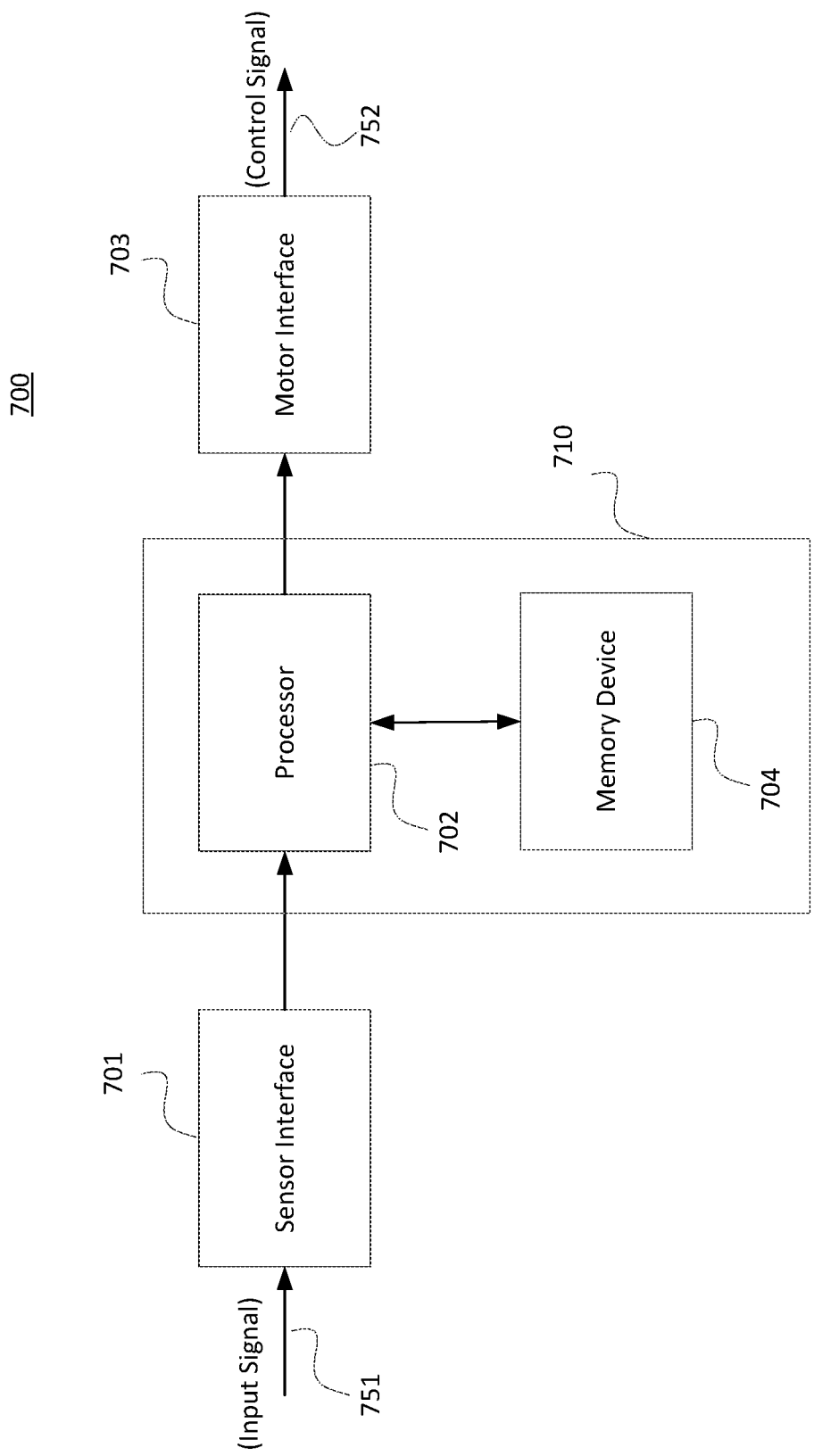
FIG. 7 shows a control circuit for controlling a motor of a push pin bearing mechanism according to one or more aspects of the disclosure.

FIG. 7 shows control circuit 700 for controlling a motor (for example, motor 508 or motor 608 in FIGS. 5 and 6) of a push pin bearing mechanism according to one or more aspects of the disclosure.

Control circuit 700 comprises sensor interface 701, computing device 710, and motor interface 703.

Sensor interface obtains input signal 751 from one or more temperature sensors 510 so that computing device 702 can control motor 508 or 608 by applying control signal 752 through motor interface 703.

Sensor interface 701 and motor interface 703 are typically in compliance with the electrical characteristics of the one or more temperature sensors 510 and motor 508,608, respectively.

With some embodiments, computing device 710 comprises processor 702 for controlling overall operation of the computing device 710 and its associated components, including memory device 704 (for example, RAM and ROM).

Computing device 710 typically includes a variety of computer readable media. Computer readable media may be any available media that may be accessed by computing device 710 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 710.

Computer-executable instructions may be stored within memory device 704 and/or storage to provide instructions to processor 702 for enabling computing device 710 to perform various functions. Embodiments may include forms of computer-readable media. Computer-readable media include any available media that can be accessed by computing device 710. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Aspects of the invention have been described in terms of illustrative embodiments thereof. Numerous other embodiments, modifications and variations within the scope and spirit of the disclosed invention will occur to persons of ordinary skill in the art from a review of this entire disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A thermostatic radiator valve (TRV) assembly comprising:
    a motor responsive to a control signal initiating motor movement, wherein the control signal is indicative of a temperature measurement;
    a push pin bearing mechanism comprising:
        a motor gear capable of providing a rotation movement responsive to the motor movement;
        a coupling gear coupled to the motor gear in order to transfer the rotational movement from the motor gear to the coupling gear;
        a bearing assembly, the bearing assembly including:
            an upper plate;
            a lower plate;
            a middle plate situated between the upper plate and the lower plate and retaining a plurality of bearings; and
            the upper plate and the middle plate capable of rotating with the coupling gear while the lower plate and a push pin are stationary with respect to a manifold pin when the push pin and the manifold pin are in contact with each other;
        a tube pressed fixed onto the coupling gear; and
        the push pin, wherein the push pin is inserted to the bearing assembly and fixed onto the tube and the push pin moves in a linear direction responsive to the rotational movement of the coupling gear, and the bearing assembly prevents the rotational movement from being transferred to the push pin when the push pin is in contact with the manifold pin.

2. The thermostatic radiator valve assembly of claim 1 further comprising:
   a manifold control mechanism comprising:
      the manifold pin; and
      a manifold valve, wherein the manifold valve is positioned in response to linear movement of the push pin.
3. The thermostatic radiator valve assembly of claim 2 further comprising:
   a manifold assembly, wherein a rate of fluid flow through the manifold assembly is controlled by the position of the manifold valve.
4. The thermostatic radiator valve assembly of claim 1, wherein the coupling gear comprises a helical gear.
5. The thermostatic radiator valve assembly of claim 1, wherein the plurality of bearings comprises ball bearings.
6. The thermostatic radiator valve assembly of claim 1 further comprising:
   a support plate; and
   the push pin inserted to the support plate.
7. The thermostatic radiator valve assembly of claim 1, further comprising a control circuit, wherein the control circuit obtains an input signal indicative of the temperature measurement and converts the input signal to the control signal.
8. An apparatus for supporting a manifold assembly, wherein the apparatus is applied to a thermostatic radiator valve (TRV) application, the apparatus comprising:
   a housing;
   a motor gear capable of providing a rotation movement;
   a coupling gear screwed into the housing and coupled to the motor gear in order to transfer the rotational movement from the motor gear to the coupling gear;
   a bearing assembly comprising:
      an upper plate;
      a lower plate;
      a middle plate situated between the upper plate and the lower plate and retaining a plurality of bearings, wherein the middle plate comprises a bearing retainer integral to the middle plate and wherein the bearing retainer retains the plurality of bearings; and
      the upper plate and the middle plate capable of rotating with the coupling gear while the lower plate and the push pin are stationary with respect to the manifold pin when the push pin and the manifold pin are in contact with each other;
   a tube pressed fixed onto the coupling gear;
   a push pin inserted to the bearing assembly and fixed onto the tube, the push pin moving in a linear direction responsive to the rotational movement of the coupling gear and capable of being in contact with a manifold pin; and
   the bearing assembly preventing the rotational movement from being transferred to the push pin when the push pin is in contact with the manifold pin.
9. The apparatus of claim 8 further comprising:
   a support plate; and
   the push pin inserted to the support plate.
10. The apparatus of claim 8, wherein the coupling gear comprises a helical gear.
11. The apparatus of claim 8, wherein the plurality of bearings comprises ball bearings.
12. An apparatus for supporting a manifold assembly, wherein the apparatus is applied to a thermostatic radiator valve (TRV) application, the apparatus comprising:
   a housing;
   a motor gear capable of providing a rotation movement;
   a coupling gear screwed into the housing and coupled to the motor gear in order to transfer the rotational movement from the motor gear to the coupling gear;
   a bearing assembly comprising:
      an upper plate;
      a lower plate;
      a middle plate situated between the upper plate and the lower plate and retaining a plurality of bearings; and
      the upper plate and the middle plate capable of rotating with the coupling gear while the lower plate and the push pin are stationary with respect to the manifold pin when the push pin and the manifold pin are in contact with each other;
   a tube pressed fixed onto the coupling gear;
   a push pin inserted to the bearing assembly and fixed onto the tube, the push pin moving in a linear direction responsive to the rotational movement of the coupling gear and capable of being in contact with a manifold pin;
   the bearing assembly preventing the rotational movement from being transferred to the push pin when the push pin is in contact with the manifold pin; and
   a bearing retainer, wherein the bearing retainer is fastened to the middle plate to retain the plurality of bearings.
13. A thermostatic radiator valve (TRV) assembly comprising:
   a motor responsive to a control signal initiating motor movement, wherein the control signal is indicative of a temperature differential;
   a push pin bearing mechanism comprising:
      a motor gear capable of providing a rotation movement responsive to the motor movement;
      a coupling gear coupled to the motor gear in order to transfer the rotational movement from the motor gear to the coupling gear;
      a bearing assembly, the bearing assembly including:
         an upper plate;
         a lower plate;
         a middle plate situated between the upper plate and the lower plate and retaining a plurality of bearings; and
         the upper plate and the middle plate capable of rotating with the coupling gear while the lower plate and a push pin are stationary with respect to a manifold pin when the push pin and the manifold pin are in contact with each other;
      a tube pressed fixed onto the coupling gear;
      the push pin, wherein the push pin is inserted to the bearing assembly and fixed onto the tube and the push pin moves in a linear direction responsive to the rotational movement of the coupling gear, and the bearing assembly prevents the rotational movement from being transferred to the push pin when the push pin is in contact with the manifold pin; and
   a control circuit configured to obtain a first temperature measurement from a first temperature sensor and a second temperature measurement from a second temperature sensor, generate the control signal based on the first and second temperature measurements, and present the control signal to the motor.
14. The thermostatic radiator valve assembly of claim 13, wherein the plurality of bearings comprises a ball bearing.
15. The thermostatic radiator valve assembly of claim 13, wherein the plurality of bearings comprises a roller bearing.
16. The thermostatic radiator valve assembly of claim 13, wherein the plurality of bearings comprises a jewel bearing.

17. The thermostatic radiator valve assembly of claim 13, wherein the plurality of bearings comprises a magnetic bearing.

18. The thermostatic radiator valve assembly of claim 13, wherein the plurality of bearings comprises a fluid bearing.

\* \* \* \* \*